United States Patent [19]

Fenton et al.

[11] 4,206,194

[45] Jun. 3, 1980

[54] REDUCING THE CONSUMPTION OF ANTHRAQUINONE DISULFONATE IN STRETFORD SOLUTIONS

[75] Inventors: Donald M. Fenton, Anaheim; Raoul P. Vaell, Los Angeles, both of Calif.

[73] Assignee: Union Oil Company of California, Brea, Calif.

[21] Appl. No.: 726,913

[22] Filed: Sep. 24, 1976

Related U.S. Application Data

[63] Continuation of Ser. No. 579,312, May 21, 1975, abandoned.

[51] Int. Cl.$^2$ .............................................. C01B 17/04
[52] U.S. Cl. ................................ 423/573 R; 423/226; 423/227
[58] Field of Search ................ 423/224, 226, 227, 571

[56] References Cited

U.S. PATENT DOCUMENTS

| | | | |
|---|---|---|---|
| 1,792,097 | 2/1931 | Jacobson | 423/571 |
| 3,642,448 | 2/1972 | Beavon | 423/573 |
| 3,928,535 | 12/1975 | Schulz | 423/573 X |

FOREIGN PATENT DOCUMENTS

| | | |
|---|---|---|
| 2719 of 1908 | United Kingdom. | |
| 948270 | 1/1964 | United Kingdom ................ 423/226 |

*Primary Examiner*—G. O. Peters
*Attorney, Agent, or Firm*—Dean Sandford; Daniel R. Farrell

[57] ABSTRACT

A process for treating a hydrogen sulfide-containing hydrogenated Claus process tail gas to convert the hydrogen sulfide to elemental sulfur in which said gas is contacted with an aqueous alkaline solution containing a water-soluble metal vanadate, a water-soluble anthraquinone disulfonate, and a water-soluble phenolic complexing agent or a water-soluble carboxylic complexing agent, to yield an effluent gas of reduced sulfur content. The solution is thereafter regenerated by contact with an oxygen-containing gas, elemental sulfur is recovered from the solution, and the regenerated solution is recycled to the gas-contacting step. The complexing agent contained in the solution reduces the chemical consumption of the anthraquinone disulfonate.

9 Claims, 1 Drawing Figure

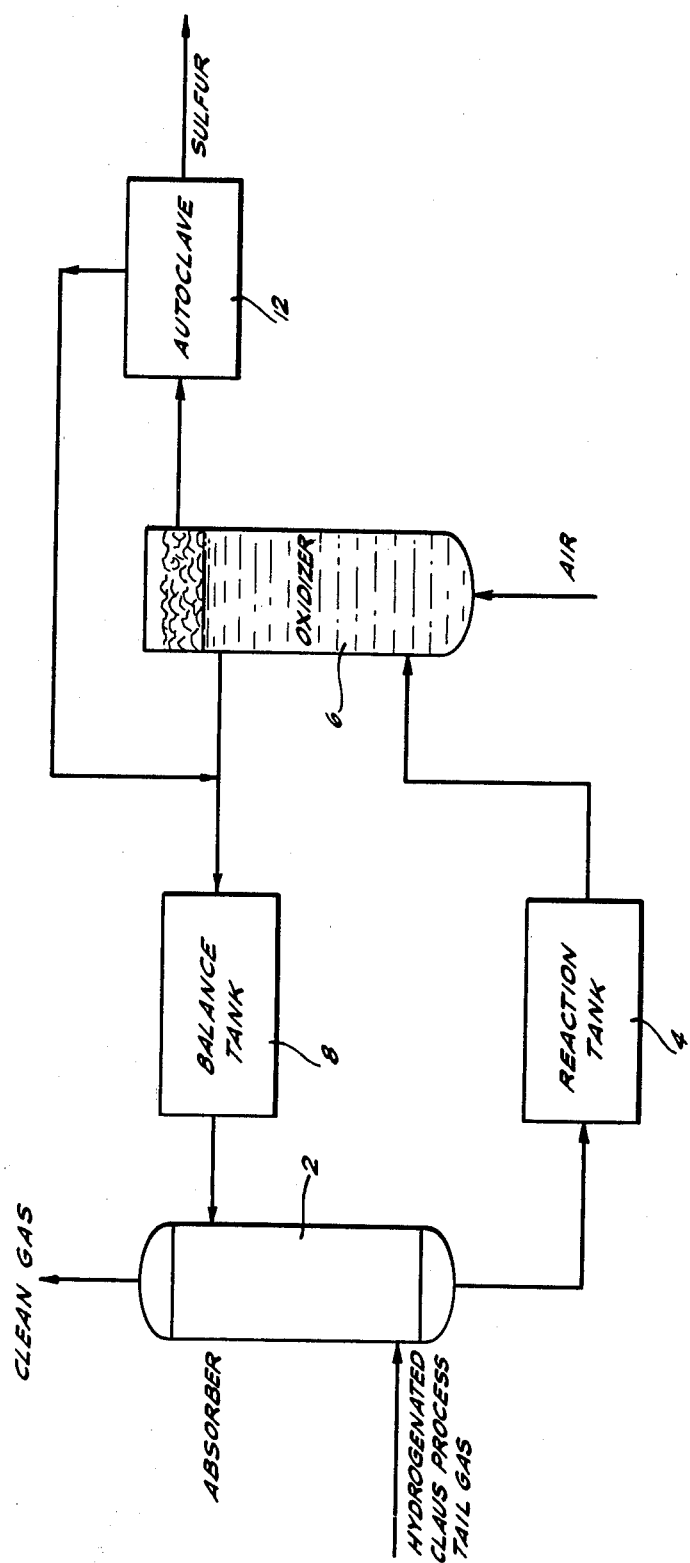

REDUCING THE CONSUMPTION OF ANTHRAQUINONE DISULFONATE IN STRETFORD SOLUTIONS

This is a continuation of application Ser. No. 579,312, filed May 21, 1975, now abandoned.

BACKGROUND OF THE INVENTION

1. Field of the Invention

This invention relates to the removal of hydrogen sulfide from gases, and more particularly to a process for removing hydrogen sulfide from hydrogenated Claus process tail gas in which the hydrogen sulfide is converted to elemental sulfur.

2. Description of the Prior Art

With the increasing concern over the pollution of the atmosphere, great demands have been made on industry to produce pollution-free products and to do so in a pollution-free manner. One area of particular concern has been the release of sulfur and its compounds into the atmosphere during the refining of petroleum, the sweetening of natural gas, the processing of ore, the destructive distillation of coal, and other processes which produce sulfur-containing gases.

The Claus process is widely employed for the desulfurization of hydrogen sulfide-containing gases and is about 90 to 97 percent effective in converting hydrogen sulfide to elemental sulfur. While substantial amounts of sulfur are recovered and, thus, prevented from being released into the atmosphere, in many instances it is necessary to further treat the Claus process tail gas to make it acceptable for discharge into the atmosphere. One process particularly useful for treating these tail gases is the Beavon sulfur removal process described in U.S. Pat. No. 3,752,877, which process involves the hydrogenation of the Claus process tail gas to convert the various sulfur compounds to hydrogen sulfide, and them employing a process, known as the Stretford process, to remove the remaining hydrogen sulfide. The Stretford process is a well-known process for converting hydrogen sulfide to elemental sulfur and is described in U.S. Pat. Nos. 2,997,439, 3,035,889, and 3,097,926.

However, while the Stretford process has been relatively successful, it has been discovered that when used to treat hydrogenated Claus process tail gas, one of the principal constituents of the washing solution, anthraquinone disulfonate, is chemically consumed, which necessitates frequent addition of this expensive chemical to maintain the proper concentration of this constituent in the washing solution. This invention is directed to reducing the consumption of anthraquinone disulfonate (ADA) and to the improvement of the Stretford process when used to treat hydrogenated Claus process tail gas.

Accordingly, a principal object of this invention is to provide an improvement in the Stretford process for the removal of hydrogen sulfide from gases and its conversion to elemental sulfur.

Another object of this invention is to provide an improvement in the Stretford process when used to treat hydrogenated Claus process tail gas.

Yet another object of this invention is to reduce the excessive amounts of ADA consumed during the Stretford process when used to treat hydrogenated Claus process tail gas.

Further objects and advantages of this invention will be apparent to those skilled in the art from the following description.

SUMMARY OF THE INVENTION

According to the present invention, a hydrogen sulfide-containing hydrogenated Claus process tail gas is treated to convert the hydrogen sulfide to elemental sulfur by contacting the gas with an aqueous alkaline solution containing a water-soluble metal vanadate, a water-soluble anthraquinone disulfonate, and a water-soluble phenolic complexing agent or a water-soluble carboxylic complexing agent to yield an effluent gas of reduced sulfur content. The solution is thereafter regenerated by contact with an oxygen-containing gas, elemental sulfur is recovered from the solution, and the regenerated solution is recycled to the gas-contacting step. The complexing agent reduces the chemical consumption of the anthraquinone disulfonate.

BRIEF DESCRIPTION OF THE DRAWING

The invention will be more readily understood by reference to the accompanying drawing which is a schematic flow diagram of the Stretford process illustrating the manner in which the hydrogenated Claus process tail gas is treated to convert hydrogen sulfide to elemental sulfur.

DETAILED DESCRIPTION

The Stretford process is used to treat hydrogenated Claus process tail gas by contacting the tail gas with an aqueous alkaline solution to produce an effluent gas of reduced sulfur content and to yield elemental sulfur; the solution is thereafter regenerated by contact with an oxygen-containing gas; the elemental sulfur is recovered from said solution; and the regenerated solution is recycled to the tail gas-contacting step.

The solution used in this process is an aqueous solution which has been made alkaline to a pH of above 7, and preferably between about 8.5 and 9.5, by the addition of alkalis such as caustic soda, caustic potash, ammonia; or sodium, potassium, or ammonium carbonates or bicarbonates; or organic bases such as alkanolamines. The preferred alkalis are sodium carbonate and bicarbonate, with sodium carbonate being the most preferred. A mixture of sodium carbonate and bicarbonate may also be used, such as a mixture of about 1 to 8 grams per liter sodium carbonate with about 10 to 30 grams per liter of sodium bicarbonate.

The solution also contains anthraquinone disulfonate (ADA), particularly the disodium salt. All the known isomers of ADA are suitable for use in this process. Also, mixtures of these isomers may be used with advantage, including commercially available mixtures which contain 1,5/1,8, 1,6/1,7, or 2,6/2,7 ADA and possibly small quantities of other isomers. Isomers 2,6 and 2,7 have a higher reactivity with sulfide and are preferred; but since the 2,7 isomer is more soluble in water, it is the most preferred material. The concentration of ADA in the solution, calculated as the disodium salt, can be as high as 6 grams per liter, but more preferably ranges from about 0.3 to 3 grams per liter, and most preferably about 2.5 grams per liter. Throughout this description, the concentration of ADA will be given in terms of the disodium salt.

The solution also contains vanadium in a water-soluble form; such as the metal or ammonium vanadates, including sodium metavanadate, sodium orthovanadate, sodium pyrovanadate, sodium ammonium vanadate or isopolyvanadate, or ammonium vanadate, with sodium metavanadate being preferred. The concentration of vanadium in the solution, calculated as the metal, should be no more than about 10 grams per liter, with the preferred range being 0.3 to 6 grams per liter; the optimum concentration depending on the volumetric flow rate of the gas and of the solution and the concentration of hydrogen sulfide in the gas being treated.

The drawing illustrates the operation of the Stretford process, wherein hydrogenated Claus process tail gas enters near the bottom of absorber 2. This tail gas typically contains about 1-3 mole percent hydrogen sulfide; about 2-20 mole percent carbon dioxide; traces of methane, water, carbonyl sulfide, carbon disulfide, elemental sulfur, carbon monoxide, methyl mercaptan, and the remainder nitrogen.

The tail gas flows upwardly through absorber 2, countercurrent to, and in intimate contact with the downflowing solution, which enters near the top of absorber 2. In most operations, a sodium carbonate solution is used to react with the hydrogen sulfide to form sodium hydrosulfide:

$$H_2S + Na_2CO_3 \rightarrow NaHS + NaHCO_3 \quad (1)$$

The hydrosulfide is oxidized to elemental sulfur by the water-soluble metal vanadate:

$$NaHS + NaHCO_3 + 2NaVO_3 \rightarrow S + Na_2V_2O_5 + Na_2CO_3 + H_2O \quad (2)$$

The solution then exits absorber 2 at the bottom thereof and enters reaction tank 4 where further and complete chemical conversion to elemental sulfur takes place. The residence time in reaction tank 4 typically varies between 10 and 15 minutes.

The sulfur-containing solution then exits reaction tank 4 and enters near the bottom of oxidizer 6. Air is admitted at the bottom of oxidizer 6 and is churned into small bubbles by a submerged, rotating stirrer-mixer (not shown) located above the air inlet. The solution, which was chemically reduced in absorber 2 and reaction tank 4, is now regenerated to its initial state. The vanadium, which has been reduced to the quadravalent state, is oxidized by oxygen back to its pentavalent state, using ADA as an oxidation catalyst:

$$Na_2V_2O_5 + 1/2O_2 \xrightarrow{ADA} 2NaVO_3 \quad (3)$$

The solution then flows to balance tank 8 from where it is ready to be recycled. Elemental sulfur appears as a froth at the top of oxidizer 6, from where it is skimmed off, and then flowed to autoclave 12. The autoclave produces molten sulfur as a product and the recovered washing solution is directed back to balance tank 8 for recycling.

It has been discovered that when treating hydrogenated Claus process tail gas, the Stretford washing solution loses ADA. The ADA is consumed at rates approaching 6 percent or more of the ADA inventory per day, particularly when a fresh solution is first circulated. The magnitude of the problem can be fully appreciated when it is realized that a Stretford unit, employing 100,000 gallons of washing solution at an ADA concentration of 2.5 grams per liter, contains about 2,000 pounds of ADA. This means that at a loss rate of 6 percent per day, 120 pounds of ADA are consumed each day; and therefore necessitating the addition of 120 pounds of ADA each day.

While the exact mechanism is not known, it is now thought that the loss of ADA from the washing solution is due to oxidation, specifically oxidation by hydrogen peroxide in the presence of ferrous ions. Hydrogen peroxide is a strong oxidizing agent; and, in the presence of ferrous ions, the hydrogen peroxide produces Fenton's reagent, which is an even stronger oxidizing agent.

$$H_2O_2 + Fe^{++} \rightarrow Fe^{+++} + OH^- + OH \cdot \text{ (Fenton's reagent)} \quad (4)$$

Although hydrogen peroxide has not been detected in the washing solution, it is believed to be produced during the oxidation step of the Stretford process; and ferrous ions have been detected in the solution at concentrations ranging up to 10 ppm and more. The likely source of the ferrous ions is corrosion of the steel process equipment. In the presence of hydrogen peroxide, a ferrous ion concentration as low as 1 ppm can prove detrimental to the ADA in the solution.

It has now been discovered that the addition to the washing solution of organic complexing agents, particularly water-soluble, phenolic complexing agents and water-soluble, carboxylic complexing agents are effective in complexing with the ferrous ions in the solution and rendering them inactive in the presence of hydrogen peroxide. The complexing agents also serve as antioxidants by being oxidized in the place of ADA.

The water-soluble, phenolic complexing agents of this invention include various water-soluble unsubstituted phenols and substituted phenols, including their salts and their hydrate forms. As used herein, the term "phenol" means the organic compound consisting of a benzene ring having one hydroxyl group joined to the ring.

The unsubstituted phenols which can be used include phenol and various water-soluble phenol salts. Exemplary water-soluble, unsubstituted phenols include:
phenol; and
sodium phenoxide.

The substituted phenols that can be used include various water-soluble hydroxy-substituted phenols, carboxy-substituted phenols, sulfonate-substituted phenols, amino-substituted phenols, amido-substituted phenol, nitro-substituted phenols, and their phenol salts. Other substituted phenols which can be used include various water-soluble alkyl-substituted phenols, aryl-substituted phenols, benzo-substituted phenols, halogen-substituted phenols and their phenol salts. Exemplary water-soluble, substituted phenols include:
hydroquinone;
resorcinol;
catechol;
mixtures of hydroquinone, catechol, and resorcinol;
salicylic acid;
3,5-disulfopyrocatechol (marketed by G. Fredrick Smith Chemical Company under the trademark TIron)
p-aminophenol;
p-hydroxybenzamide;
p-nitrophenol;
ortho-cresol;
meta-cresol;
para-cresol;
cresol (commercial mixture of o, m, and p-cresol);
p-carboxyphenol;

1-nitro-2-naphthol;
1-naphthol; and
chlorophenols.

If salts of the water-soluble, phenolic complexing agents are used, the sodium salt is preferred, although salts of other alkali metals, such as potassium, can also be used.

Of the phenolic complexing agents used in the practice of this invention, phenol, cresol, and salicylic acid are preferred, with cresol being particularly preferred.

As used throughout this specification, the term "substituted" is not exclusive, and does allow for substitutions other than the group denominated. For example, a carboxy-substituted phenol may have one or more carboxy groups and one or more other groups substituted thereon.

The water-soluble, carboxylic complexing agents of this invention include water-soluble unsubstituted carboxylic acids and water-soluble substituted carboxylic acids, including their salts and their hydrate forms. As used herein, the term "carboxylic acid" means an organic compound having at least one carboxyl group.

The unsubstituted carboxylic complexing agents which can be used include various water-soluble monocarboxylic acids, dicarboxylic acids, polycarboxylic acids, and their salts. Exemplary water-soluble, unsubstituted carboxylic complexing agents include:
acetic acid;
sodium acetate;
formic acid;
oxalic acid;
succinic acid; and
sodium succinate.

The substituted carboxylic complexing agents which can be used include various water-soluble amino-substituted carboxylic acids, hydroxy-substituted carboxylic acids, thio-substituted carboxylic acids, and their salts. Exemplary water-soluble, substituted carboxylic complexing agents include:
glycolic acid;
tartaric acid;
gluconic acid;
sodium gluconate;
citric acid;
ethylenediaminetetraacetic acid;
malic acid;
lactic acid;
mercaptoacetic acid; and
mercaptosuccinic acid.

If salts of the water-soluble carboxylic complexing agents are used, the sodium salt is preferred, although salts of other alkali metals, such as potassium, can also be used.

Of the carboxylic complexing agents, the polycarboxylic acids are preferred due to their high water-solubility, such as citric acid; acetic acid is preferred due to its low cost; and formic acid is particularly preferred for its ability to protect ADA.

The concentration of the complexing agent needed to provide adequate protection against the oxidation of ADA will depend on the concentration of the ADA, the hydrogen peroxide, and the ferrous ions in the washing solution, and on the effectiveness of the particular organic complexing agent used. However, it is desired that the concentration of the complexing agent in the washing solution be maintained at from about 0.01 to 10 grams per liter, and more preferably from about 0.1 to 2 grams per liter. Because of the low concentration requirements of the complexing agent, the water-solubility of the complexing agent need only be at least 0.01 grams per liter. In the practice of this invention, the proper concentration of the organic complexing agent in the washing solution can be obtained by adding to the solution amounts ranging from about 0.01 to 10 grams per liter of solution, and preferably from about 0.1 to 2 grams per liter of solution. Further, in view of the mechanism by which the various phenolic and carboxylic complexing agents function, they may be present in the washing solution as a mixture of two or more complexing agents; and the concentration of the complexing agent in the washing solution would be the concentration of the mixture.

The invention is further illustrated by the following examples which are illustrative of various aspects of the invention, and are not intended as limiting the scope of the invention as defined by the appended claims.

EXAMPLE 1

The following laboratory procedure is used to measure the effectiveness of the organic complexing agents used in this invention to reduce the oxidation loss of ADA in the presence of ferrous ions.

A 100 ml aqueous solution having an ADA concentration of 19 grams per liter and containing 0.1 weight percent ferrous chloride is prepared. To this solution is added 5 ml of a 30 volume percent solution of hydrogen peroxide. Then 2 grams of the organic complexing agent to be tested is admixed with the solution. If the complexing agent is an acid, it is neutralized to a pH of 7 before admixing it with the solution. The resulting solution is heated for 1 hour at 110° F., and then the ADA concentration of the solution, corrected for dilution, is determined. The corrected ADA concentration is termed the deactivating value.

The following Table lists the results obtained when selected organic complexing agents are tested by the above-described procedure.

TABLE 1

| Complexing Agent | Deactivating Value |
| --- | --- |
| None | 6.6 |
| Malic acid | 11.8 |
| Sodium acetate | 14.6 |
| 3,5-disulfopyrocatechol ("Tiron") | 15.3 |
| Cresol (commercial mixture) | 16.0 |
| p-Nitrophenol | 16.5 |
| Glycolic acid | 17.1 |
| Sodium succinate | 17.2 |
| Tartaric acid | 17.4 |
| Oxalic acid | 18.0 |
| Sodium gluconate | 18.2 |
| Phenol | 18.2 |
| Citric acid | 18.4 |
| Formic acid | 18.4 |
| Salicylic acid | 18.7 |

It is preferred that in the practice of this invention the complexing agent used have a deactivating value of at least about 15, more preferably at least about 16, and most preferably at least about 18.

EXAMPLE 2

The Stretford unit selected for testing is producing about 2 long tons of sulfur per day and contains about 100,000 gallons (378,541 liters) of solution. The unit is being fed hydrogenated tail gas from a Claus unit which is treating a hydrogen sulfide-containing gas. The approximate composition of the solution is 2.5 grams of ADA per liter, 2.3 grams of vanadium per liter, 12.5 grams of sodium bicarbonate per liter and 7.5 grams of sodium carbonate per liter. The pH of the solution is about 8.7. It is estimated that the solution is losing ADA at a rate of about 6 percent of the solution inventory per day. A commercial mixture of cresol is selected as the complexing agent and about 378.5 kilograms, or about 1 gram of cresol per liter of solution, is added to the solution so that the cresol concentration of the solution becomes about 1 g/l. The ADA consumption rate is again measured and found to have decreased to about 1 percent per day.

Various embodiments and modifications of this invention have been described in the foregoing description, and further modifications will be apparent to those skilled in the art. Such modifications are included within the scope of this invention as defined by the following claims.

Having now described the invention, we claim:

1. In the process for treating a hydrogen sulfide containing hydrogenated Claus process tail gas to convert the hydrogen sulfide to elemental sulfur in which said Claus process tail gas is contacted with an aqueous alkaline washing solution containing a water-soluble metal vanadate and a water-soluble anthraquinone disulfonate to yield an effluent gas of reduced sulfur content, thereafter the solution is contacted with an oxygen-containing gas to form elemental sulfur and to regenerate said solution, said elemental sulfur is recovered from said solution and said regenerated solution is recycled to said gas contacting step, said contact between said Claus process tail gas and said solution resulting in the chemical consumption of said anthraquinone disulfonate, the improvement comprising:

maintaining in said solution an effective amount of a solubilized material selected from the group consisting of water-soluble phenols, the water-soluble salts and hydrates of phenols, and mixtures thereof, said solubilized material having a deactivating value of at least about 15 whereby the chemical consumption of said anthraquinone disulfonate is substantially reduced.

2. The process defined in claim 1 wherein the concentration of said solubilized material in said solution is between about 0.01 and 10 grams per liter.

3. The process defined in claim 1 wherein said solubilized material is phenol and the soluble salts and hydrates thereof.

4. The process defined in claim 1 wherein the solubilized material is o-cresol, the soluble salts and hydrates thereof, p-cresol, the soluble salts and hydrates thereof, m-cresol, the soluble salts and hydrates thereof, and mixtures thereof.

5. The process as defined in claim 1 wherein said solubilized material comprises the soluble salts and hydrates of salicylic acid.

6. The process of claim 1 wherein said solubilized material in said solution has a deactivating value of at least about 16.

7. The process as defined in claim 1 wherein said solubilized material in said washing solution has a deactivating value of not less than about 18.

8. In the process for treating a hydrogen-sulfide-containing hydrogenated Claus process tail gas to convert the hydrogen sulfide to elemental sulfur in which said gas is contacted with an aqueous alkaline washing solution containing a water-soluble metal vanadate and a water-soluble anthraquinone disulfonate to yield an effluent gas of reduced hydrogen sulfide content, the solution thereafter is regenerated by contact with an oxygen-containing gas, elemental sulfur is recovered from said solution and said regenerated solution is recycled to said gas-contacting step and in which said anthraquinone disulfonate is being chemically consumed, the improvement which comprises:

maintaining in solution about 0.1 to 2 gm/l of an organic complexing agent in said washing solution, said complexing agent being selected from the group consisting of phenol, o-cresol, m-cresol, p-cresol, the alkali metal salts and hydrates of salicylic acid, and mixtures thereof, said organic complexing agent having a deactivating value of at least about 16 whereby the chemical consumption of said anthraquinone disulfonate is substantially reduced.

9. The process as defined in claim 8 wherein said organic complexing agent is phenol, o-cresol, m-cresol, p-cresol, the alkali metal salts and hydrates thereof and mixtures thereof.

* * * * *